United States Patent [19]

Yagyu et al.

[11] Patent Number: 5,486,601

[45] Date of Patent: Jan. 23, 1996

[54] TRISAZO DYE, AND AQUEOUS INK COMPOSITION CONTAINING THE SAME

[75] Inventors: Tatsuya Yagyu, Neyagawa; Takashi Ono, Takatsuki, both of Japan

[73] Assignee: Orient Chemical Industries, Ltd., Osaka, Japan

[21] Appl. No.: 314,001

[22] Filed: Sep. 28, 1994

[30] Foreign Application Priority Data

Sep. 29, 1993 [JP] Japan .................................. 5-242597

[51] Int. Cl.$^6$ ........................... C09B 35/46; C09D 11/00
[52] U.S. Cl. .................. 534/666; 534/680; 534/685; 534/728; 534/810; 534/815; 106/22 K
[58] Field of Search ..................... 534/680, 685, 534/666, 810, 815; 106/22 K

[56] References Cited

U.S. PATENT DOCUMENTS

| | | | |
|---|---|---|---|
| 3,915,953 | 10/1975 | Mori et al. ............................ | 534/581 |
| 5,340,929 | 8/1994 | Ono et al. ............................ | 534/680 |

FOREIGN PATENT DOCUMENTS

| | | | |
|---|---|---|---|
| 0556741 | 8/1993 | European Pat. Off. . | |
| 0555868 | 8/1993 | European Pat. Off. . | |
| 2180883 | 11/1973 | France . | |
| 59-102955 | 6/1984 | Japan ................................ | 534/728 |
| 666026 | 2/1952 | United Kingdom ................. | 534/680 |
| 1098126 | 1/1968 | United Kingdom . | |

*Primary Examiner*—Robert W. Ramsuer
*Assistant Examiner*—Fiona T. Powers
*Attorney, Agent, or Firm*—Birch, Stewart, Kolasch & Birch

[57] ABSTRACT

Disclosed is a trisazo dye represented by the formula:

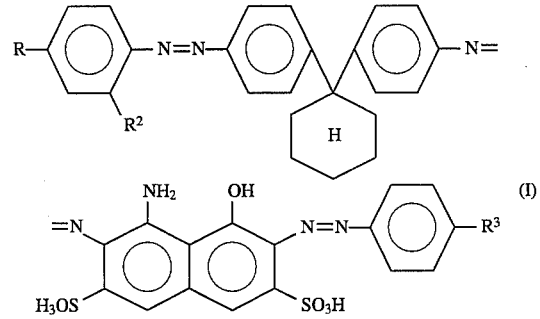

wherein $R^1$ and $R^2$ independently represent a substituted amino group which is substituted with hydrogen, a hydroxyl group, a carboxyl group, an amino group, an alkyl group having 1 to 4 carbon atoms, a hydroxyalkyl group or an acyl group, or an alkyl group having 1 to 4 carbon atoms or an alkoxy group having 1 to 4 carbon atoms; and $R^3$ is hydrogen, an alkyl or alkoxy group having 1 to 6 carbon atoms; provided that $R^1$ and $R^2$ are not amino groups or substituted amino groups simultaneously.

A process for producing the trisazo dye and an aqueous ink composition containing the trisazo dye are also disclosed.

11 Claims, 5 Drawing Sheets

Example 5

Example 6

Example 7

Example 8

TRISAZO DYE, AND AQUEOUS INK COMPOSITION CONTAINING THE SAME

FIELD OF THE INVENTION

The present invention relates to a novel trisazo dye, a process for producing the same and an aqueous ink composition containing the same black dye. More particularly, it relates to a trisazo dye which is superior in safety to the human body.

BACKGROUND OF THE INVENTION

Heretofore, there have been proposed various polyazo dyes for writing or ink-jet printing onto materials to be recorded such as papers, or for dyeing fibers or papers. A number of polyazo dyes are substantive, so that a dyeing process using the polyazo dyes is simple, as well as fastness of the polyazo dyes is comparatively good. The polyazo dyes having such an advantage are widely used in the art.

However, the polyazo dye has a problem to be solved. The first problem is chemical properties. Excellent chemical properties (e.g., stable solubility, stability with time of dyed density, light-resistance, etc.) are particularly required for the dye which is used as ink for writing implements. The second problem is safety. Safety of chemical substances is a great concern in recent years, so that dyes having excellent safety which have no harmful effect on the human body are required.

As the dyes having improved dyeability and fastness, for example, there have widely been used black trisazo dye or polyazo dye derived from benzidine or its derivatives (e.g., C.I. Direct Black 19, C.I. Direct Black 154, C.I. Direct Black 168, etc.) for the above applications. However, these dyes are inferior in safety to the human body because the results of AMES test of the dyes shows false positive or positive.

On the other hand, as the polyazo black dyes having improved safety to the human body, there have been used a food pigment (e.g., Food Black 2, etc.), a recording solution using the same as a recording agent, a 4,4'-diaminodiphenylamine-2-sulfonic acid based trisazo dye instead of a benzidine based one, a stilbenic tetrakisazo dye free of amino group in its molecule. However, an aqueous ink composition using these dyes provides poor water resistance and poor light-resistance in the handwriting and is inferior in dyeability and fastness.

A water-soluble dye is usually separated from an aqueous phase by means such as acid separation, salting-out and the like. However, since inorganic salts are included in the course of such separation means, it is difficult to obtain a highly pure dye and various problems due to impurities may be arisen. For example, when a low-purity dye is used as aqueous ink for writing implements, continuous replenishing of ink to the penpoint may be interfered. Also, when such a low-purity dye is used as ink for ink-jet recording, an orifice of the apparatus may be clogged.

SUMMARY OF THE INVENTION

One object of the present invention is to provide a trisazo dye having excellent chemical properties (e.g., dyeability, fastness, hue, density, solubility, etc.), as well as excellent safety.

Another object of the present invention is to provide a process for producing the trisazo dye having high purity.

Still another object of the present invention is to provide an aqueous ink composition containing the trisazo dye.

BRIEF DESCRIPTION OF THE DRAWINGS

These objects as well as other objects and advantages of the present invention will become apparent to those skilled in the art from the following description.

DETAILED DESCRIPTION OF THE INVENTION

Figure 1:
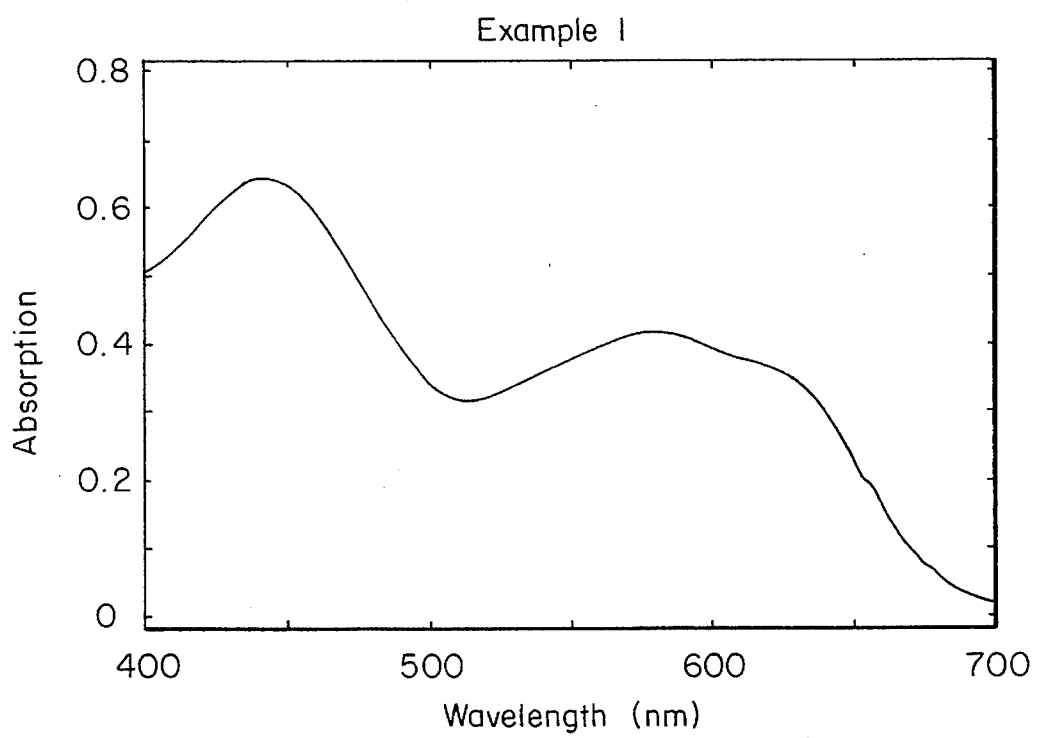
FIG. 1 is a graph illustrating a visible spectrum of the dye obtained in Example 1.

The present invention provides a trisazo dye represented by the formula:

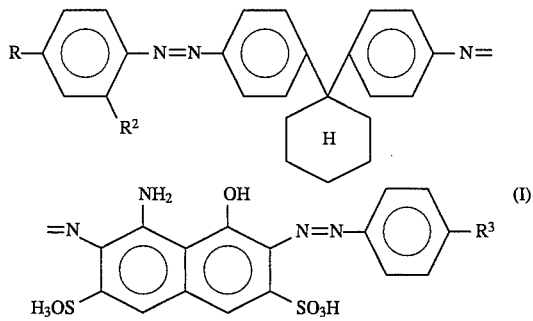

wherein $R^1$ and $R^2$ independently represent a hydrogen atom, a hydroxyl group, a carboxyl group, an amino group, an alkyl group having 1 to 4, preferably 1 to 2 carbon atoms, a substituted amino group which is substituted with a hydroxyalkyl group or an acyl group, or an alkoxy group having 1 to 4, preferably 1 to 2 carbon atoms; and $R^3$ is a hydrogen atom, an alkyl or alkoxy group having 1 to 6, preferably 1 to 4 carbon atoms; provided that both $R^1$ and $R^2$ are not amino groups nor substituted amino groups.

Generally, one of $R^1$ and $R^2$ is selected from the group consisting of a hydrogen atom, an amino group, a hydroxyl group, a methyl group, a t-butyl group, a methoxy group, an ethoxy group, a carboxyl group, an acetylamino group, a dimethylamino group, a methylamino group, a diethylamino group, an ethylamino group, a N-(β-oxyethyl)amino group, a N,N-di(β-oxyethyl)amino group and a N-ethyl-N-(β-oxyethyl)amino group, and the other is selected from the group consisting of a hydroxyl group, a methyl group, a t-butyl group, a methoxy group, an ethoxy group and a carboxyl group.

Preferably, one of $R^1$ or $R^2$ is a hydroxyl group, and the other is selected from the group consisting of a hydroxyl group, a methyl group, a t-butyl group, a methoxy group, an ethoxy group, an acetylamino group.

More preferably, trisazo dye according to claim 1, wherein one of $R^1$ or $R^2$ is selected from the group consisting of an amino group, an acetylamino group, a dimethylamino group, a methylamino group, a diethylamino group, an ethylamino group, a N-(β-oxyethyl)amino group, a N,N-di(β-oxyethyl)amino group and a N-ethyl-N-(β-oxyethyl)amino group, and the other is selected from the group consisting of a hydrogen atom, a methyl group and a carboxyl group.

Still more preferably, one of $R^1$ or $R^2$ is selected from the group consisting of an amino group and a diethylamino group, and the other is selected from the group consisting of a hydroxyl group, a methyl group and a carboxyl group.

Generally, $R^3$ is selected from the group consisting of a hydrogen atom, a methyl group, an ethyl group, an isopropyl group, a n-butyl group, an isobutyl group, a sec-butyl group, a methoxy group and an ethoxy group.

Preferably, $R^3$ is selected from the group consisting of a hydrogen atom, a methyl group, a n-butyl group, an isobutyl group and a sec-butyl group.

The trisazo dye of the present invention may be produced by a process, which comprises the steps of:

(a) acid coupling a tetrazonium salt of 1,1-bis(4-aminophenyl)cyclohexane with 1-amino-8-naphthol-3,6-disulfonic acid (H acid);

(b) adjusting pH of the reactant to weak alkali, and adding a diazonium salt of an aniline derivative represented by the formula:

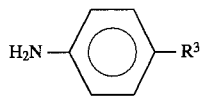

(II)

wherein $R^3$ is as defined above, to conduct the reaction; and (c) adding a coupler represented by the formula:

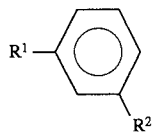

(III)

wherein $R^1$ and $R^2$ are as defined above, to conduct the reaction.

The trisazo dye of the present invention is a novel trisazo dye derived from 1,1-bis(4-aminophenyl)cyclohexane of the formula:

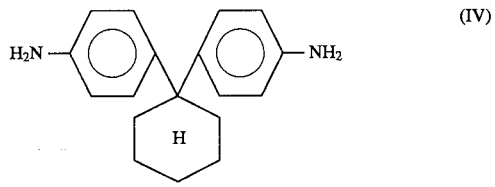

(IV)

which is a tetrazotizable intermediate material. This dye intermediate has excellent safety, because it exhibits negative in mutagenicity as opposed to benzidine. A tetrazonium salt obtained by diazotizing the compound is also comparatively stable.

In general, the dye intermediate is synthesized by a known method as shown hereinafter.

240 Parts of aniline is mixed with 240 parts of hydrochloric acid with stirring, and then 75 parts of cyclohexanone is added to the mixture, which is subjected to the condensation reaction with stirring at 102° to 108° C. for about 24 hours. Then, 700 parts of a 45% aqueous sodium hydroxide solution is added and the non-reacted aniline is collected by steam distillation. Thereafter, 1,1-bis(4-aminophenyl)cyclohexane can be obtained as a crude solid by cooling. In the preferred embodiment of the present invention, this intermediate was purified from solvent to afford a high-purity product, which was used.

The trisazo dye having a structure represented by the above formula (I) can be obtained, for example, by the production process including the steps (1) to (5) of:

(1) tetrazotizing 1,1,-bis(4-aminophenyl)cyclohexane (1 mole) of the above formula (IV) by a conventional method to obtain a tetrazonium salt;

(2) adding an aqueous solution of 1-amino-8-naphthol-3,6-disulfonic acid (H acid) (1 mole) to the resulting tetrazotized solution to permit acid coupling to the amino group of H acid at the oltho-position;

(3) after adjusting the pH values of this reaction solution to 8.0 to 9.0 with an alkalifying agent, adding the diazotized aniline derivative (1 mole) of the above formula (II) to obtain a disazo dye;

(4) adding a coupler (1 mole) of the formula (III) to the reaction solution to conduct coupling , thereby affording a trisazo dye; and (5) separating the trisazo dye from the reaction solution by acid separation, followed by purifying with desalting.

Examples of the aniline derivative (II) used in the step (3) include non-substituted or substituted anilines such as aniline, p-toluidine, p-ethylaniline, p-(isopropyl)aniline, p-(n-butyl)aniline, p-(sec-butyl)aniline, p-anisidine, p-phenetidine and the like. Preferred examples thereof include alkyl-substituted anilines such as aniline, p-toluidine, p-(isopropyl)aniline, p-(n-butyl)aniline, p-(sec-butyl)aniline and the like. Particularly preferred examples thereof include p-(n-butyl)aniline.

Examples of the coupler (III) used in the step (4) include phenol derivatives and N-substituted aniline derivatives such as m-aminophenol, resorcinol, m-cresol, 3-(tert-butyl)phenol, 3-methoxyphenol, 3-ethoxyphenol, m-acetylaminophenol, m-dimethylaminophenol, m-ethylaminophenol, m-toluidine, N,N-diethyl-m-toluidine, N,N-dimethylaniline-3-carboxylic acid, N-(β-oxyethyl)aniline, N,N-di(β-oxyethyl)aniline and N-ethyl-N-(β-oxyethyl)aniline. Preferred examples thereof include m-aminophenol and N,N-diethyl-m-toluidine. Particularly preferred examples thereof include m-aminophenol.

The sulfonic acid group in the trisazo dye of the present invention can be converted into alkali metal salts (e.g., Li salt, Na salt and K salt) or ammonium ($NH_4$) salts, which is also the case with a lot of conventional azo dyes having a sulfonic group. Further, it can also be converted into amine salts by the use of a water-soluble alkanolamine.

Examples of the alkanolamine include alkanol group-containing amines such as ethanolamine, diethanolamine, triethanolamine, propanolamine, N-cyclohexyl-N-ethanolamine and the like.

It is also possible to impart water-solubility or water/alcohol-solubility to the trisazo dye of the present invention by converting its sulfonic group into amine salts.

In the preferred embodiment of the present invention, purification with desalting is conducted in the acid separation step (5) for separating the trisazo dye obtained in the above steps (1) to (4) of the present invention from the reaction solution. The conventional problem caused by inclusion of impurities such as inorganic salts in the process for separating a water-soluble dye can be solved by such a purification step.

In the trisazo dye of the present invention, since the proportion occupied by sulfonic groups in the dye molecule is small, the product obtained by acid separation can be easily washed with water. After the product was filtered, it was purified with desalting by washing with water sufficiently until an electric conductance of the filtrate becomes not more than 200 μS. It is particularly preferred that the water-soluble dye of the present invention is purified until the concentration of the inorganic salt becomes about 2000 ppm or less.

Further, the present invention provides an aqueous ink composition comprising a trisazo dye having a structure of the formula (I) and an aqueous medium.

The aqueous medium which can be suitably used for the aqueous ink composition of the present invention may be water or an organic solvent which is miscible with water, but is not specifically limited. Suitable examples thereof include monohydric alcohols (e.g., lower alcohols such as ethanol, n-propyl alcohol, iso-propanol, n-butanol and diacetone alcohol; monoalkyl ethers of diol such as ethylene glycol monomethyl ether, ethylene glycol monoethyl ether, propylene glycol monoethyl ether, diethylene glycol monoethyl ether, diethylene glycol monobutyl ether and dipropylene glycol monoethyl ether; monoacetates of diol such as ethylene glycol monoacetate and propylene glycol monoacetate; benzyl alcohol; and cyclohexanol), dihydric alcohols (e.g., glycols such as ethylene glycol, diethylene glycol, trimethylene glycol, triethylene glycol, tetraethylene glycol, polyethylene glycol, propylene glycol and butanediol), trihydric alcohols (e.g., glycerin, trimethylolpropane and 1,2,6-hexanetriol), dioxane, N-methyl-2-pyrrolidone, ethyl lactate and the like. It is particularly preferred to use low-toxic or non-toxic ethanol, propyl alcohol, ethylene glycol, propylene glycol monoalkyl ether, N-methyl-2-pyrrolidone, lactates and the like.

The preferred amount of the trisazo dye contained in the aqueous ink composition of the present invention varies depending on the application of ink, and is not specifically limited. In general, the amount of trisazo dye is 5 to 10% by weight for aqueous ball-point pen, 5 to 15% by weight for marking pen and 3 to 10% by weight for ink-jet recording, respectively.

The preferred amount of the aqueous medium contained in the aqueous ink composition of the present invention is 5 to 95% by weight, preferably 5 to 80% by weight, more preferably 5 to 30% by weight, based on the total amount of the ink composition.

Further, according to the application and purpose of ink, additives which are usually used may be included. Examples thereof include water-soluble resins (e.g., low condensate of vinyl pyrrolidone, water-soluble alkyd resin, water-soluble acrylic resin, etc.), alcohol-soluble resins (e.g., alcohol-soluble phenol resin, acrylic resin, styrene-maleic acid resin, ketone resin, etc.), antiseptics/mildewcides, pH adjustors, surfactants and the like.

The trisazo dye of the present invention have light resistance which is equivalent to that of an azo dye (e.g., benzidine dye, triazine dye, etc.) as well as excellent water resistance (water resistance of handwriting) which is superior to that of the azo dye, and is superior in solubility to an aqueous medium. Also, the trisazo dye of the present invention affords a negative result in a reverse mutagenicity test using microorganism, i.e. so-called AMES test which is known as a test method for obtaining a safety standard to the human body.

The aqueous ink composition of the present invention can be used as ink for writing implements and ink-jet recording ink as well as various black inks having excellent solution stability and storage stability, and its handwriting is fast. Further, even if an aqueous solution of the trisazo dye obtained according to the process of the present invention is used for dyeing cellulose fibers or papers, its build-up properties are excellent and it enables fast dyeing.

EXAMPLES

The following Examples and Comparative Examples further illustrate the present invention in detail, but they must not be construed to limit the scope thereof. In the Examples and Comparative Examples, all "parts" are by weight unless otherwise stated.

Example 1

26.6 Parts (0.1 moles) of 1,1'-bis(4-aminophenyl)cyclohexane was dissolved in 25 parts of concentrated hydrochloric acid and 150 parts of water with heating. A 36% aqueous solution of sodium nitrite (42.5 parts, 0.2 moles) was added at 0° C. to tetrazotize the solution. An aqueous solution of 1-amino-8-naphthol-3,6-disulfonic acid (36.4 parts, 0.1 moles) was added to the resulting tetrazotized solution, which was stirred at 5° to 10° C. for additional 2 hours. Then, the pH values of this solution were adjusted to 3.5 to 4.0 with a 10% aqueous solution of sodium carbonate, followed by stirring at 5° to 15° C. for additional 17 hours. Then, the pH values of this solution were adjusted to 8.3 to 8.6 with a 20% aqueous solution of sodium carbonate. Thereafter, a solution of p-(n-butyl)aniline (14.9 parts, 0.1 moles) which was diazotized in advance by a conventional method was added and the mixture was stirred at 5° to 15° C. for 5 hours. A solution prepared by dissolving m-aminophenol (10.9 parts, 0.1 moles) in 150 parts of water was added to this solution which was stirred overnight to complete the reaction.

To the resulting dye-containing solution, concentrated sulfuric acid was added to separate a dye (acid separation), which was filtered, washed with water, purified with desalting and dried to obtain 90 parts of a black dye represented by the following chemical structure. A maximum absorption wavelength (nm) of a visible absorption spectrum is also shown below.

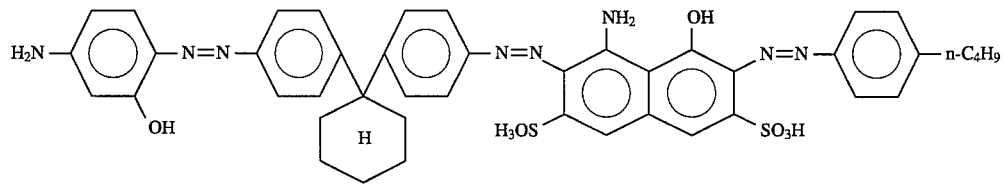

λmax (nm): 442 and 582 greenish black

Solubility, and fastness of the handwriting of the present ink composition were evaluated, as well as AMES test of the present dye (Na salt) was conducted. Results obtained are shown in Table 1 and Table 3, respectively. Further, a visible spectrum of the resulting dye (Na salt) is shown in FIG. 1.

Example 2

According to the same manner as that described in Example 1 except for employing resorcinol (11.0 parts, 0.1 moles) instead of m-aminophenol used in Example 1, a black dye represented by the following structure was obtained. A maximum absorption wavelength (nm) of a visible absorption spectrum is also shown below.

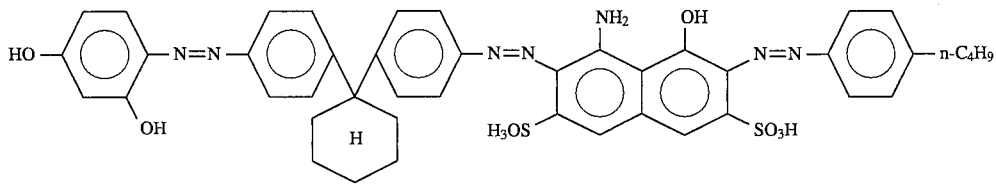

λmax (nm): 346 and 580 greenish black

Figure 2:
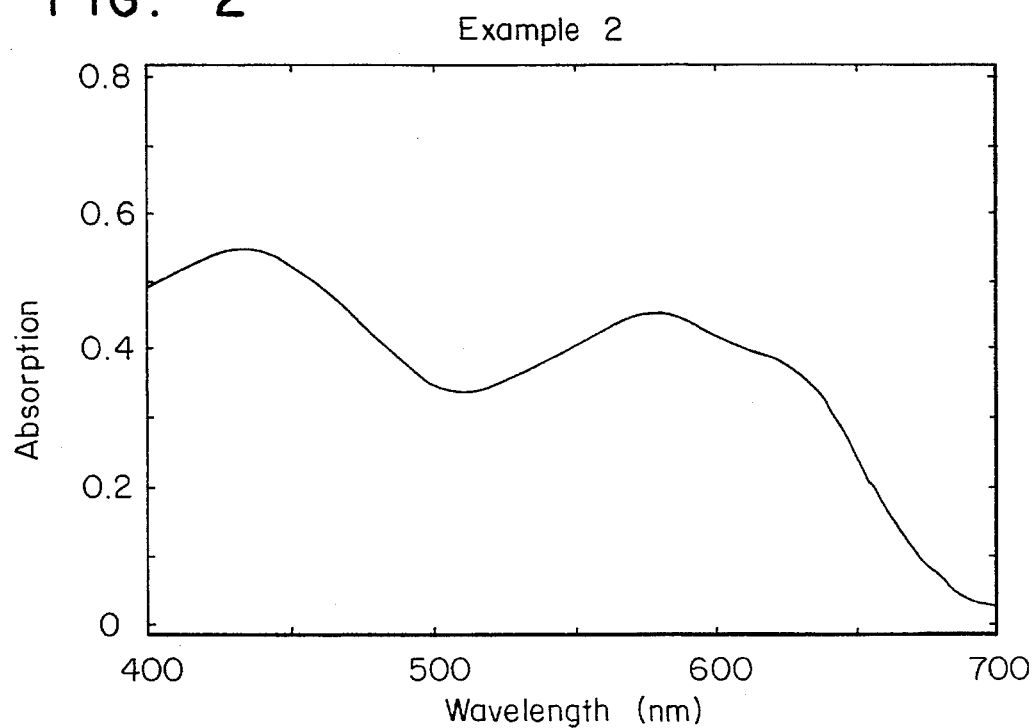
FIG. 2 is a graph illustrating a visible spectrum of the dye obtained in Example 2.

Solubility, and fastness of the handwriting of the present ink composition were evaluated, as well as AMES test of the present dye (Na salt) was conducted. Results obtained are shown in Table 1 and Table 3, respectively. Further, a visible spectrum of the resulting dye (Na salt) is shown in FIG. 2.

Example 3

According to the same manner as that described in Example 1 except for employing p-(sec-butyl)aniline (14.9 parts, 0.1 moles) instead of p-(n-butyl)aniline used in Example 1, a black dye represented by the following structure was obtained. A maximum absorption wavelength (nm) of a visible absorption spectrum is also shown below.

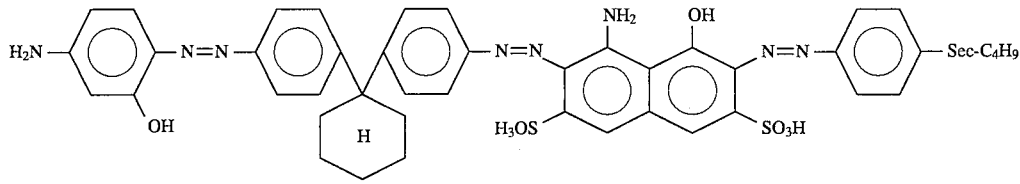

λmax (nm): 442 and 588 greenish black

Figure 3:
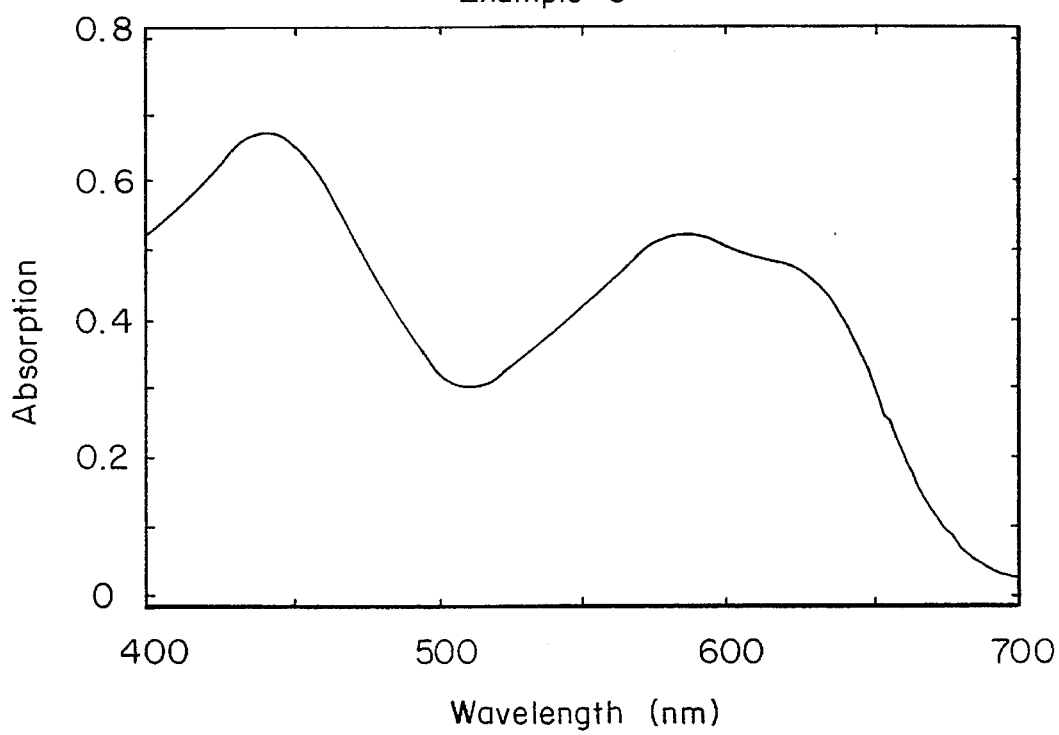
FIG. 3 is a graph illustrating a visible spectrum of the dye obtained in Example 3.

Solubility, and fastness of the handwriting of the present ink composition were evaluated, as well as AMES test of the present dye (Na salt) was conducted. Results obtained are shown in Table 1 and Table 3, respectively. Further, a visible spectrum of the resulting dye (Na salt) is shown in FIG. 3.

Example 4

According to the same manner as that described in Example 1 except for employing aniline (9.3 parts, 0.1 moles) instead of p-(n-butyl)aniline used in Example 1, a black dye represented by the following structure was obtained. A maximum absorption wavelength (nm) of a visible absorption spectrum is also shown below.

λmax (nm): 440 and 592 greenish black

Figure 4:
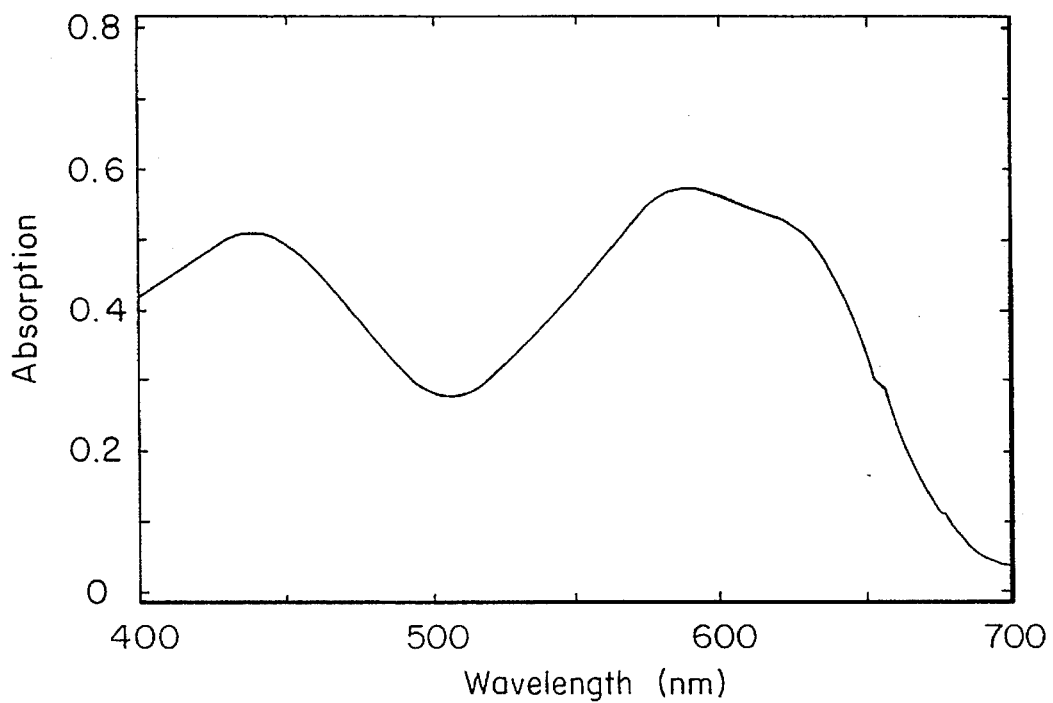
FIG. 4 is a graph illustrating a visible spectrum of the dye obtained in Example 4.

Solubility, and fastness of the handwriting of the present ink composition were evaluated, as well as AMES test of the present dye (Na salt) was conducted. Results obtained are shown in Table 1 and Table 3, respectively. Further, a visible spectrum of the resulting dye (Na salt) is shown in FIG. 4.

Example 5

According to the same manner as that described in Example 1 except for employing p-(iso-propyl)aniline (13.5 parts, 0.1 moles) instead of p-(n-butyl)aniline used in Example 1, a black dye represented by the following structure was obtained. A maximum absorption wavelength (nm) of a visible absorption spectrum is also shown below.

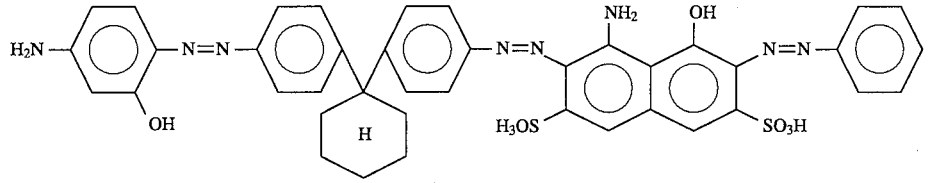

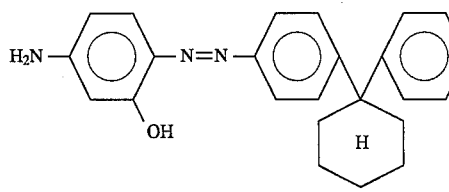
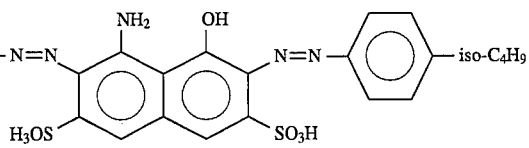

λmax (nm): 442 and 582 greenish black

Figure 5:
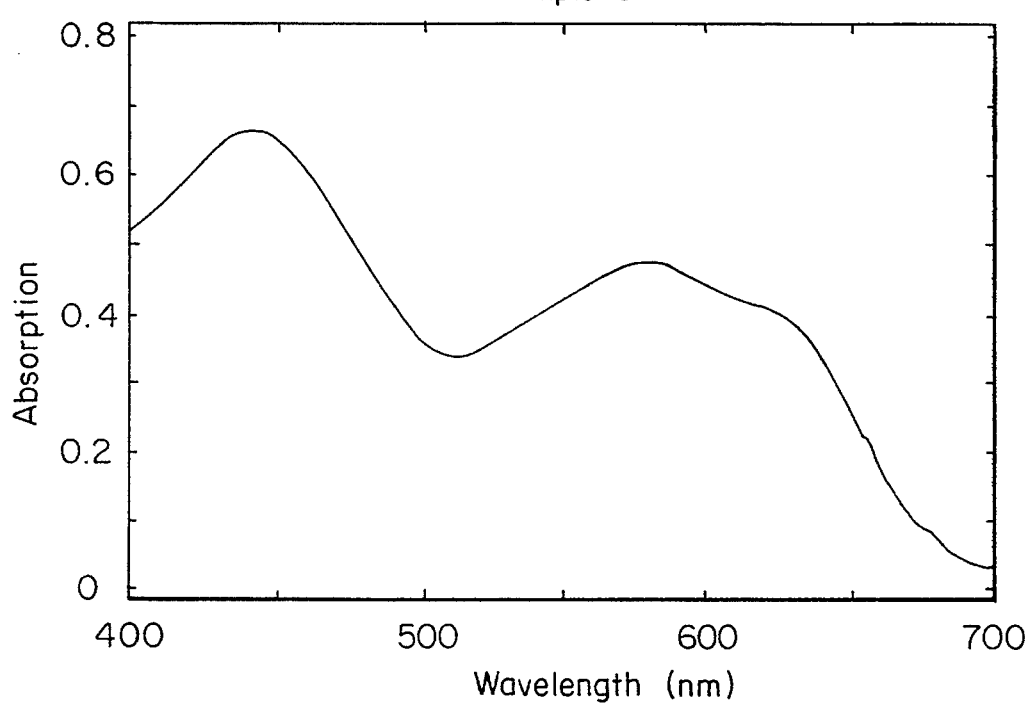
FIG. 5 is a graph illustrating a visible spectrum of the dye obtained in Example 5.

Solubility, and fastness of the handwriting of the present ink composition were evaluated, as well as AMES test of the present dye (Na salt) was conducted. Results obtained are shown in Table 1 and Table 3, respectively. Further, a visible spectrum of the resulting dye (Na salt) is shown in FIG. 5.

Example 6

According to the same manner as that described in Example 1 except for employing p-toluidine (10.7 parts, 0.1 moles) instead of p-(n-butyl)aniline used in Example 1, a black dye represented by the following structure was obtained. A maximum absorption wavelength (nm) of a visible absorption spectrum is also shown below.

Figure 7:
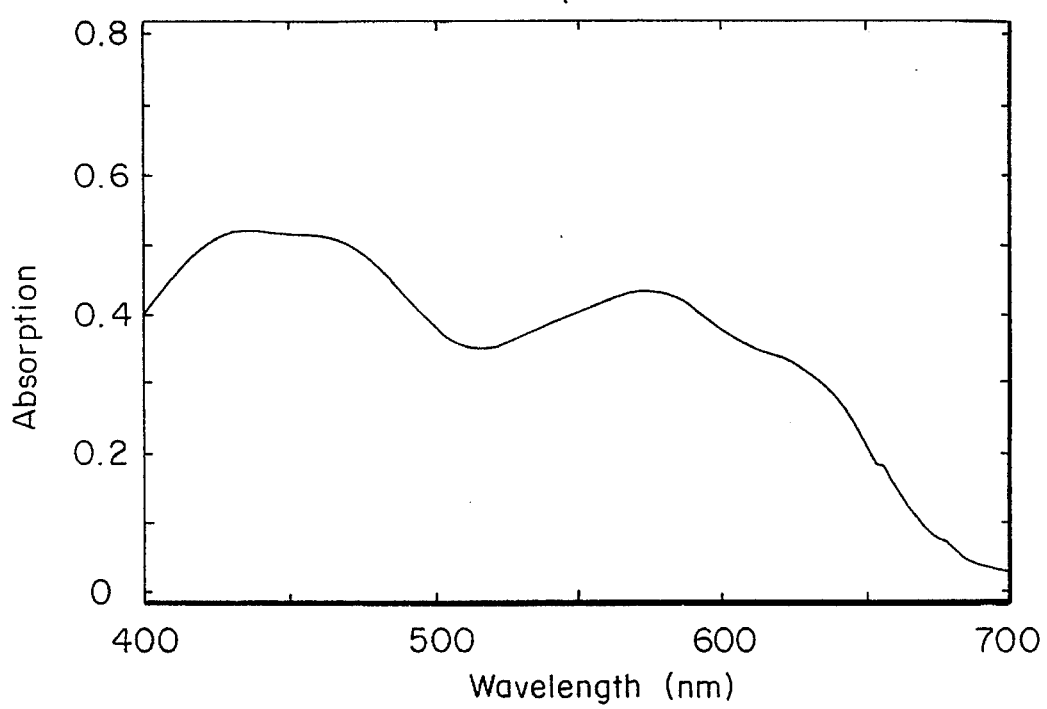
FIG. 7 is a graph illustrating a visible spectrum of the dye obtained in Example 7.

Solubility, and fastness of the handwriting of the present ink composition were evaluated, as well as AMES test of the present dye (Na salt) was conducted. Results obtained are shown in Table 1 and Table 3, respectively. Further, a visible spectrum of the resulting dye (Na salt) is shown in FIG. 7.

Example 8

According to the same manner as that described in Example 1 except for employing N,N-dimethylaniline-3-carboxylic acid (16.5 parts, 0.1 moles) instead of m-aminophenol used in Example 1, a black dye represented by the following structure was obtained. A maximum absorption wavelength (nm) of a visible absorption spectrum is also shown below.

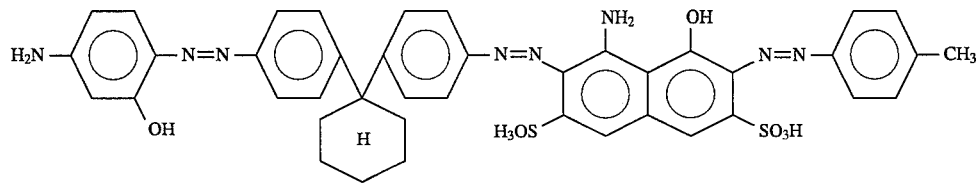

λmax (nm): 442 and 582 greenish black

Figure 6:
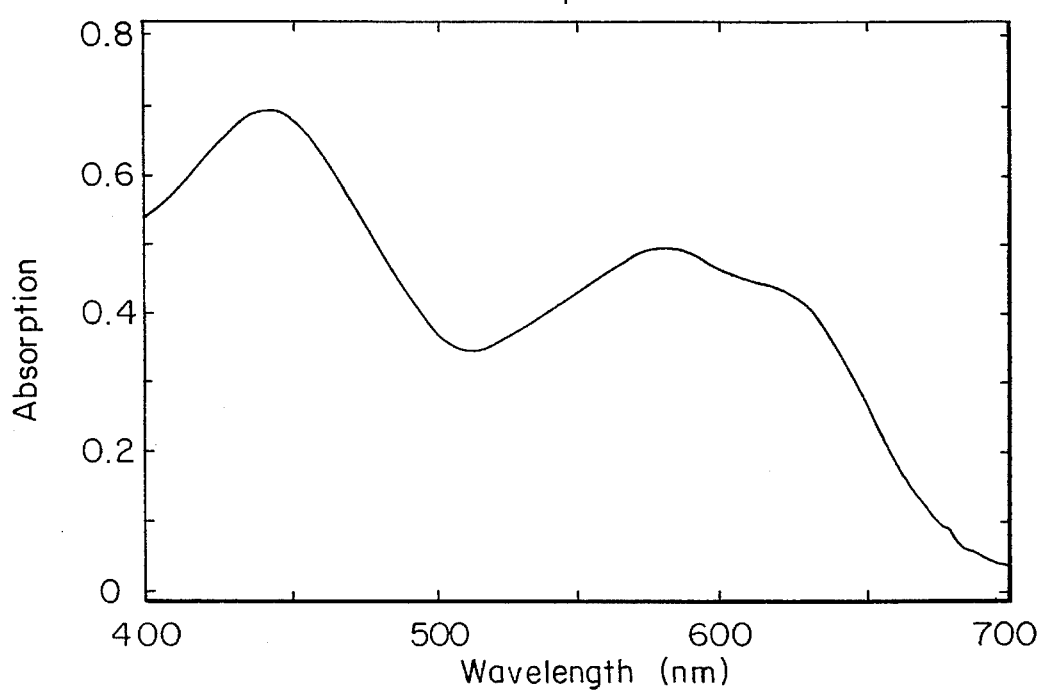
FIG. 6 is a graph illustrating a visible spectrum of the dye obtained in Example 6.

Solubility, and fastness of the handwriting of the present ink composition were evaluated, as well as AMES test of the present dye (Na salt) was conducted. Results obtained are shown in Table 1 and Table 3, respectively. Further, a visible spectrum of the resulting dye (Na salt) is shown in FIG. 6.

Example 7

According to the same manner as that described in Example 1 except for employing N,N-diethyl-m-toluidine (16.3 parts, 0.1 moles) instead of m-aminophenol used in Example 1, a black dye represented by the following structure was obtained. A maximum absorption wavelength (nm) of a visible absorption spectrum is also shown below.

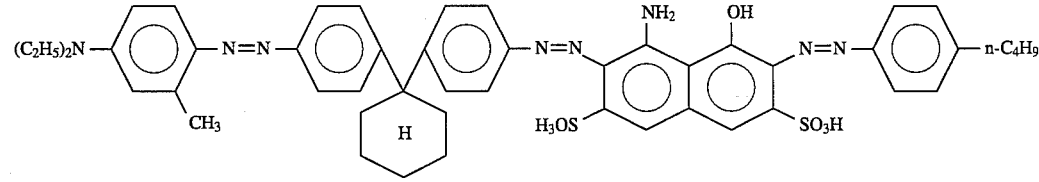

λmax (nm): 436 and 576 greenish black

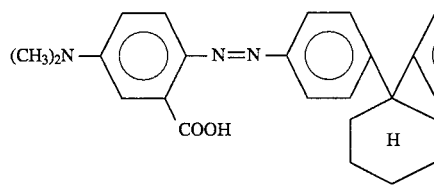 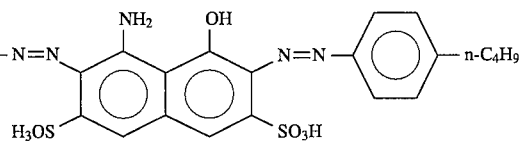

λmax (nm): 416, 576 and 656 greenish black

Figure 8:
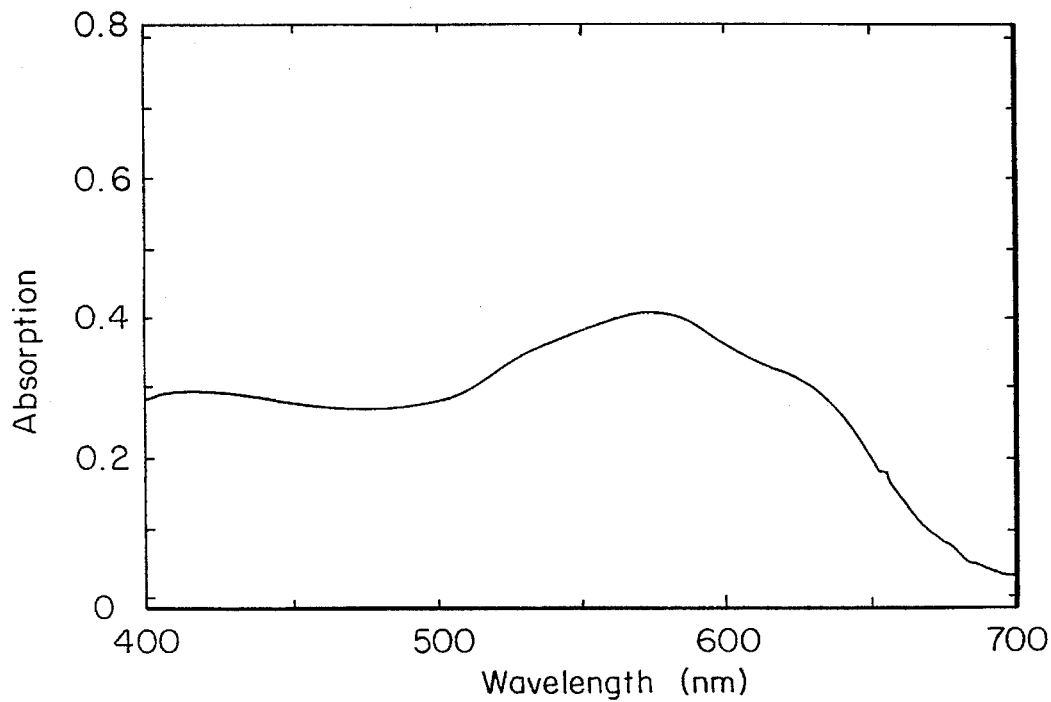
FIG. 8 is a graph illustrating a visible spectrum of the dye obtained in Example 8.

Solubility, and fastness of the handwriting of the present ink composition were evaluated, as well as AMES test of the present dye (Na salt) was conducted. Results obtained are shown in Table 1 and Table 3, respectively. Further, a visible spectrum of the resulting dye (Na salt) is shown in FIG. 8.

Example 9

According to the same manner as that described in Example 1 except for employing m-dimethylaminophenol (16.5 parts, 0.1 moles) instead of m-aminophenol used in Example 1, a black dye represented by the following structure was obtained. A maximum absorption wavelength (nm) of a visible absorption spectrum is also shown below.

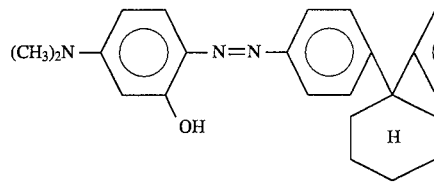 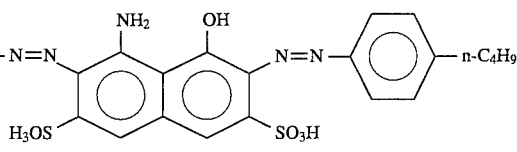

λmax (nm): 434 and 588 greenish black

Figure 9:
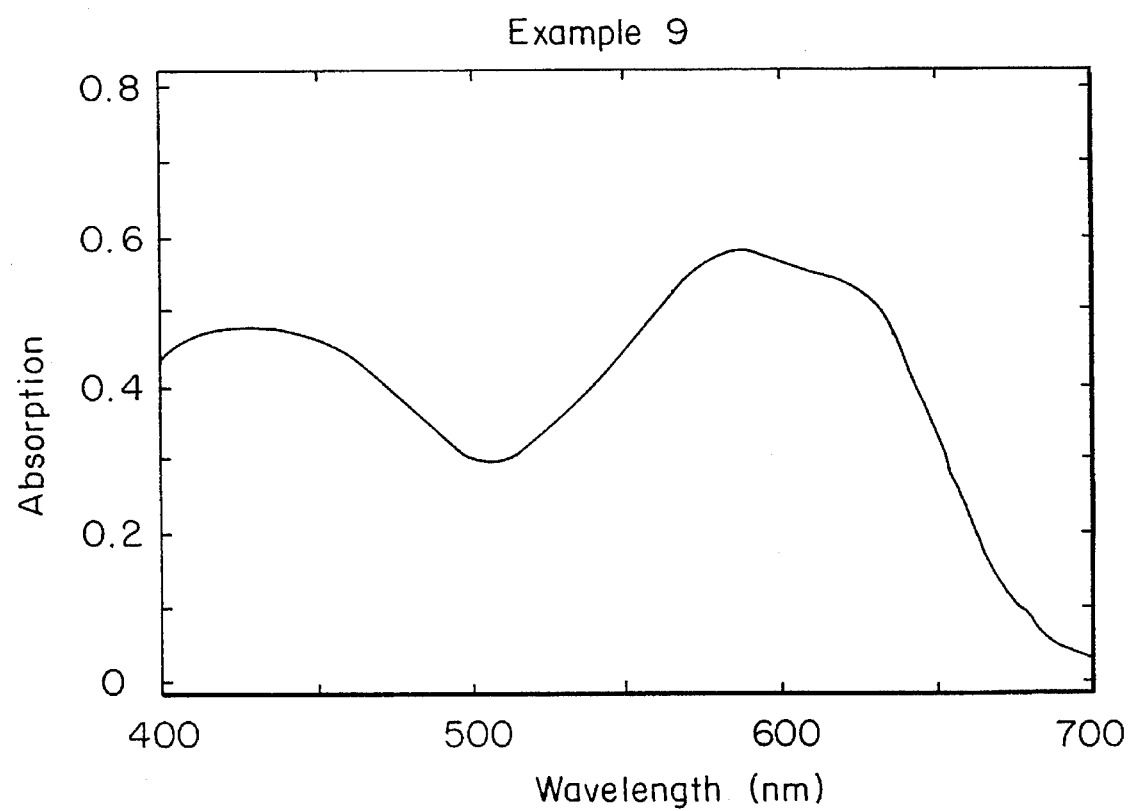
FIG. 9 is a graph illustrating a visible spectrum of the dye obtained in Example 9.

Solubility, and fastness of the handwriting of the present ink composition were evaluated, as well as AMES test of the present dye (Na salt) was conducted. Results obtained are shown in Table 1 and Table 3, respectively. Further, a visible spectrum of the resulting dye (Na salt) is shown in FIG. 9.

Comparative Examples 1 to 3

According to the same manner as that described in Example 1 except for employing the following trisazo dye or polyazo dye, the evaluation of handwriting/recording/drawing and AMES test were conducted, respectively. The results are shown in Table 2 and Table 3.

Comparative Example 1
C.I. Direct Black 19 (yellowish black)
Comparative Example 2
C.I. Direct Black 154 (greenish black)
Comparative Example 3
C.I. Direct Black 168 (reddish black)

Evaluation Method of Solubility of Dye

Solubility:

A Na salt (2 g) of the resulting dye was dissolved in water (10 g), and the dye solution was filtered and concentrated/dried to determine a solubility (g of dye/100 g of water) of the dye.

(Evaluation criteria)
⊚: solubility is not less than 15
o: solubility is within a range from 10 to 15
Δ: solubility is within a range from 5 to 10
×: solubility is not more than 5

Evaluation of the Handwriting

Light resistance:

The resulting dye (Na salt) was dissolved in a 5% aqueous ethylene glycol solution such that the concentration of the dye became 3%, and the resulting solution was spread on a writing paper (size A, JIS P-3201) using an applicator to give a test paper having a thickness of 25 μm. The test paper was exposed to sunlight for one month and the discoloration degree was compared with that of the paper before test.

Water resistance:

The above test paper was air-dried for one hour and then dipped in tap water. Then, the reflection density of the paper was measured by a Macbeth densitometer TR-927 (manufactured by Colmomogen Co.) and the reflection density was compared with that of the paper before test.

(Evaluation criteria)

Light resistance:
⊚: Color changing and fading are scarcely observed.
o: Color changing and fading are observed.
×: Color changing and fading are severe Water resistance:
⊚: The reflection density is not less than 70% of that before test.
o: The reflection density is within a range of 50 to 70% of that before test.
×: The reflection density is not more than 50% of that before test.

(Evaluation method of AMES test)

Regarding specimen solutions containing the trisazo compounds (dyes) of the present invention obtained in Examples 1 to 9 and dyes of Comparative Examples 1 to 3, respectively, the total number of the mutant colony was determined using the strain TA98. The magnification of the total number of the colony determined by AMES test to the control is shown in Table 2. When the resulting magnification is not more than 2, it is evaluated as "negative". On the other hand, when the resulting magnification is not less than 2, it is evaluated as "positive". The results are shown in Table 2.

In Table 1, the modification in case that no drug-metabolizing active enzyme S-9 is added is shown in the column "−" and the modification in case that a drug-metabolizing active enzyme S-9 is added is shown in the column "+".

TABLE 1

| Example No. | Trisazo dye | | | Fastness of the handwriting | | Solubility Dye(g)/ water | Evaluation |
|---|---|---|---|---|---|---|---|
| | $R^1$ | $R^2$ | $R^3$ | Water resistance | Light resistance | (100 g) | |
| 1 | $NH_2$ | OH | $n\text{-}C_4H_9$ | ⊙ | ○ | 12 | ○ |
| 2 | OH | OH | $n\text{-}C_4H_9$ | ○ | ○ | 15 | ⊙ |
| 3 | $NH_2$ | OH | $sec\text{-}C_4H_9$ | ⊙ | ○ | 12 | ○ |
| 4 | $NH_2$ | OH | H | ○ | ○ | 15 | ⊙ |
| 5 | $NH_2$ | OH | $iso\text{-}C_3H_7$ | ⊙ | ○ | 13 | ○ |
| 6 | $NH_2$ | OH | $CH_3$ | ⊙ | ○ | 15 | ⊙ |
| 7 | $N(C_2H_5)_2$ | $CH_3$ | $n\text{-}C_4H_9$ | ⊙ | ○ | 12 | ○ |
| 8 | $N(CH_3)_2$ | COOH | $n\text{-}C_4H_9$ | ○ | ○ | 15 | ⊙ |
| 9 | $N(CH_3)_2$ | OH | $n\text{-}C_4H_9$ | ○ | ○ | 12 | ○ |

TABLE 2

| Comparative Example No. | Dye | Fastness of the handwriting | | Solubility Dye(g)/ water | Evaluation |
|---|---|---|---|---|---|
| | | Water resistance | Light resistance | (100 g) | |
| 1 | C.I. Direct Black 19 | ⊙ | ○ | 20 | ⊙ |
| 2 | C.I. Direct Black 154 | ○ | ○ | 20 | ⊙ |
| 3 | C.I. Direct Black 168 | ○ | ○ | 20 | ⊙ |

TABLE 3

| Example No. | S9 | Concentration of test substance (μg/plate) | | | | | AMES Evaluation |
|---|---|---|---|---|---|---|---|
| | | 20 | 78 | 313 | 1250 | 5000 | |
| 1 | − | 0.91 | 0.86 | 0.91 | 0.95 | 0.50 | Negative |
| | + | 1.21 | 1.03 | 0.90 | 0.63 | 0.69 | |
| 2 | − | 0.78 | 0.70 | 0.61 | 0.39 | 0.30 | Negative |
| | + | 1.09 | 1.09 | 0.55 | 0.55 | 0.42 | |
| 3 | − | 0.81 | 0.50 | 0.50 | 0.50 | 0.69 | Negative |
| | + | 0.81 | 1.31 | 1.00 | 0.56 | 0.69 | |
| 4 | − | 1.00 | 0.93 | 1.07 | 0.87 | 0.93 | Negative |
| | + | 1.44 | 1.40 | 1.08 | 1.16 | 0.96 | |
| 5 | − | 0.90 | 0.76 | 1.07 | 0.83 | 0.48 | Negative |
| | + | 1.77 | 1.27 | 1.41 | 1.45 | 1.05 | |
| 6 | − | 1.19 | 1.22 | 1.48 | 1.30 | 1.15 | Negative |
| | + | 1.38 | 1.43 | 0.95 | 0.68 | 0.65 | |
| 7 | − | 1.05 | 1.10 | 0.90 | 0.62 | 1.10 | Negative |
| | + | 1.03 | 0.92 | 0.81 | 1.08 | 1.03 | |
| 8 | − | 0.76 | 0.86 | 0.86 | 0.76 | 0.71 | Negative |
| | + | 1.13 | 0.94 | 1.06 | 0.53 | 0.59 | |
| 9 | − | 0.77 | 0.73 | 0.58 | 0.38 | 0.54 | Negative |
| | + | 1.15 | 1.37 | 0.77 | 0.41 | 0.59 | |
| Comparative Example 1 | − | 2.00 | 4.45 | 9.77 | 20.05 | 33.32 | Positive |
| | + | 45.36 | 130.76 | 59.20 | 20.60 | 25.61 | |
| Comparative Example 2 | − | 0.78 | 0.94 | 1.11 | 0.72 | 0.83 | Positive |
| | + | 1.70 | 2.47 | 3.60 | 0.43 | 0.43 | |
| Comparative Example 3 | − | 1.13 | 0.88 | 0.88 | 0.88 | 0.77 | Positive |
| | + | 1.08 | 0.88 | 1.08 | 1.38 | 3.38 | |

Example 10

| Component | Amount (Parts by weight) |
|---|---|
| Deionized water | 71.8 |
| Propylene glycol | 20.0 |
| Dye of Example 1 (Na salt) | 8.0 |
| Surfactant (YUNIDINE DS-401) | 0.1 |
| Antiseptic/mildewcide | 0.1 |

According to the above formulation, black ink for aqueous ball-point pen was produced and its writing performances were examined. As a result, it afforded smooth writing for a long period of time, and light resistance and water resistance of the handwriting were excellent.

Example 11

| Component | Amount (Parts by weight) |
|---|---|
| Deionized water | 69.8 |
| Ethylene glycol | 10.0 |
| Diethylene glycol | 10.0 |
| Dye of Example 7 (Na salt) | 10.0 |
| Antiseptic/mildewcide | 0.2 |

According to the above formulation, black ink for felt-tip pen was produced and its writing performances were examined. As a result, it afforded smooth writing for a long period of time, and light resistance and water resistance of the handwriting were excellent.

Example 12

| Component | Amount (Parts by weight) |
|---|---|
| Deionized water | 89.0 |
| Diethylene glycol | 5.0 |
| Dye of Example 1 (Na salt) | 3.0 |
| N-methyl-2-pyrrolidone | 3.0 |

According to the above formulation, black ink for ink-jet recording was produced and its recording performances were examined using a commercially available ink-jet printer. As a result, it afforded smooth printing without causing clogging of orifice, and light resistance and water resistance of the recorded letters and images were excellent. Further, the reflection density at the solid printing portion was measured. As a result, it was 1.2.

What is claimed is:

1. A trisazo dye represented by the formula:

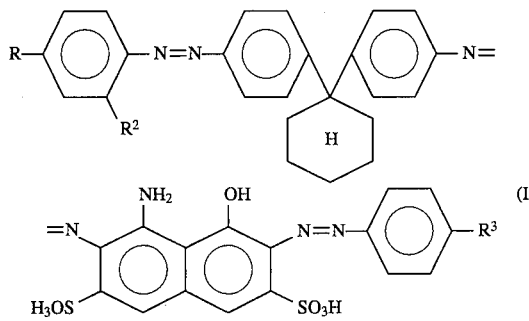

wherein $R^1$ and $R^2$ independently represent a hydrogen atom, a hydroxyl group, a carboxyl group, an amino group, an alkyl group having 1 to 4 carbon atoms, a substituted amino group which is substituted with a hydroxyalkyl group or an acyl group, or an alkoxy group having 1 to 4 carbon atoms; and $R^3$ represents a hydrogen atom, an alkyl or alkoxy group having 1 to 6 carbon atoms; provided that both $R^1$ and $R^2$ are not amino groups nor substituted amino groups.

2. The trisazo dye according to claim 1, wherein one of $R^1$ or $R^2$ is selected from the group consisting of a hydrogen atom, an amino group, a hydroxyl group, a methyl group, a t-butyl group, a methoxy group, an ethoxy group, a carboxyl group, an acetylamino group, a dimethylamino group, a methylamino group, a diethylamino group, an ethylamino group, a N-(β-oxyethyl)amino group, a N,N-di(β-oxyethyl)amino group and a N-ethyl-N-(β-oxyethyl)amino group, and the other is selected from the group consisting of a hydroxyl group, a methyl group, a t-butyl group, a methoxy group, an ethoxy group and a carboxyl group.

3. The trisazo dye according to claim 1, wherein one of $R^1$ or $R^2$ is a hydroxyl group, and the other is selected from the group consisting of a hydroxyl group, a methyl group, a t-butyl group, a methoxy group, an ethoxy group, an acetylamino group.

4. The trisazo dye according to claim 1, wherein one of $R^1$ or $R^2$ is selected from the group consisting of an amino group, an acetylamino group, a dimethylamino group, a methylamino group, a diethylamino group, an ethylamino group, a N-(β-oxyethyl)amino group, a N,N-di(β-oxyethyl)amino group and a N-ethyl-N-(β-oxyethyl)amino group, and the other is selected from the group consisting of a hydrogen atom, a methyl group and a carboxyl group.

5. The trisazo dye according to claim 1, wherein one of $R^1$ or $R^2$ is selected from the group consisting of an amino group and a diethylamino group, and the other is selected from the group consisting of a hydroxyl group, a methyl group and a carboxyl group.

6. The trisazo dye according to claim 1, wherein one of $R^1$ or $R^2$ is an amino group, and the other is a hydroxyl group.

7. The trisazo dye according to claim 1, wherein one of $R^1$ or $R^2$ is a diethylamino group, and the other is a methyl group.

8. The trisazo dye according to claim 1, wherein $R^3$ is selected from the group consisting of a hydrogen atom, a methyl group, an ethyl group, an isopropyl group, a n-butyl group, an isobutyl group, a sec-butyl group, a methoxy group and an ethoxy group.

9. The trisazo dye according to claim 1, wherein $R^3$ is selected from the group consisting of a hydrogen atom, a methyl group, a n-butyl group, an isobutyl group and a sec-butyl group.

10. The trisazo dye according to claim 1, wherein $R^3$ is a n-butyl group.

11. An aqueous ink composition comprising the trisazo dye of claim 1 and an aqueous medium.

* * * * *